(12) United States Patent
Yan (10) Patent No.: US 11,269,497 B2
(45) Date of Patent: Mar. 8, 2022

(54) INFORMATION PROCESSING METHOD FOR CANCELLING RELEASE OF A SKILL IN A GAME, APPARATUS, ELECTRONIC DEVICE AND STORAGE MEDIUM

(71) Applicant: NETEASE (HANGZHOU) NETWORK CO., LTD., Zhejiang (CN)

(72) Inventor: Jingjing Yan, Zhejiang (CN)

( * ) Notice: Subject to any disclaimer, the term of this patent is extended or adjusted under 35 U.S.C. 154(b) by 0 days.

(21) Appl. No.: 15/965,857

(22) Filed: Apr. 28, 2018

(65) Prior Publication Data
US 2018/0373406 A1 Dec. 27, 2018

(30) Foreign Application Priority Data
Jun. 21, 2017 (CN) .......................... 201710476734.0

(51) Int. Cl.
*G06F 3/0484* (2013.01)
*G06F 3/0488* (2013.01)
(Continued)

(52) U.S. Cl.
CPC ........ *G06F 3/0484* (2013.01); *A63F 13/2145* (2014.09); *A63F 13/426* (2014.09);
(Continued)

(58) Field of Classification Search
CPC .. G06F 3/0484; G06F 3/0488; G06F 3/04817; G06F 3/04883; A63F 13/00
See application file for complete search history.

(56) References Cited

U.S. PATENT DOCUMENTS

| 5,598,524 A * | 1/1997 | Johnston, Jr | G06F 3/0486 |
| | | | 715/769 |
| 10,459,887 B1 * | 10/2019 | Dvortsov | G06F 3/0485 |

(Continued)

FOREIGN PATENT DOCUMENTS

| CN | 101937302 A | 1/2011 |
| CN | 103092469 A | 5/2013 |

(Continued)

OTHER PUBLICATIONS

IBM, Translucent Drag Icons (TDB Acc. No. NN9502609), Feb. 1, 1995, 38 IBM Technical Disclosure Bulletin 609-610 (Year: 1995).*

(Continued)

*Primary Examiner* — Justin R. Blaufeld
(74) *Attorney, Agent, or Firm* — Novick, Kim & Lee, PLLC; Allen Xue (57) ABSTRACT

An information processing method for Cancelling Release of a Skill in a Game and apparatus, electronic device and a storage medium are provided. The method includes that: a cancellation response region is provided on a graphical user interface; when detecting the starting touch point of the touch operation is positioned within the range of the skill icon, a position of a current touch point of the touch operation is obtained in real time; when detecting that the position of the current touch point satisfies a preset condition, a size of the cancellation response region is controlled to be enlarged; and when detecting that the position of the current touch point of the touch operation is within a range of the cancellation response region, or, when detecting that a position of an ending touch point of the touch operation is within a range of the cancellation response region, release of a skill is cancelled.

15 Claims, 4 Drawing Sheets

(51) Int. Cl.
  *A63F 13/2145* (2014.01)
  *A63F 13/426* (2014.01)
  *A63F 13/53* (2014.01)
  *G06F 3/0481* (2013.01)
  *A63F 13/822* (2014.01)
  *A63F 13/533* (2014.01)
  *G06F 3/04883* (2022.01)
  *G06F 3/04817* (2022.01)

(52) U.S. Cl.
  CPC ............ *A63F 13/53* (2014.09); *G06F 3/0488* (2013.01); *A63F 13/533* (2014.09); *A63F 13/822* (2014.09); *A63F 2300/1075* (2013.01); *A63F 2300/6045* (2013.01); *A63F 2300/807* (2013.01); *G06F 3/04817* (2013.01); *G06F 3/04883* (2013.01)

(56) References Cited

U.S. PATENT DOCUMENTS

| | | | |
|---|---|---|---|
| 2001/0011995 A1* | 8/2001 | Hinckley | G06F 3/03549 345/156 |
| 2007/0245257 A1* | 10/2007 | Chan | G06F 16/3328 715/769 |
| 2008/0270896 A1* | 10/2008 | Kristensson | G06F 3/0236 715/261 |
| 2009/0033633 A1* | 2/2009 | Newman | G06Q 30/02 345/173 |
| 2009/0163275 A1* | 6/2009 | Ishii | A63F 13/10 463/31 |
| 2010/0192102 A1* | 7/2010 | Chmielewski | G06F 3/04883 715/834 |
| 2011/0130182 A1* | 6/2011 | Namba | A63F 13/42 463/3 |
| 2011/0285636 A1* | 11/2011 | Howard | A63F 13/2145 345/173 |
| 2012/0084692 A1* | 4/2012 | Bae | G06F 3/0483 715/769 |
| 2013/0019205 A1* | 1/2013 | Gil | G06F 3/04812 715/834 |
| 2013/0019206 A1* | 1/2013 | Kotler | G06F 3/04812 715/834 |
| 2013/0132873 A1* | 5/2013 | Takayasu | A63F 13/67 715/764 |
| 2013/0174094 A1* | 7/2013 | Heo | G06F 3/04883 715/835 |
| 2014/0015786 A1* | 1/2014 | Honda | G06F 3/04886 345/173 |
| 2014/0123036 A1 | 5/2014 | Bao et al. | |
| 2014/0181714 A1* | 6/2014 | Anderson | G06F 3/0482 715/769 |
| 2015/0080073 A1* | 3/2015 | Naoi | A63F 13/822 463/9 |
| 2015/0231500 A1* | 8/2015 | Aizono | A63F 13/833 463/31 |
| 2015/0378459 A1* | 12/2015 | Sawada | G06F 3/0488 345/173 |
| 2016/0124518 A1* | 5/2016 | Takahashi | A63F 13/822 463/31 |
| 2017/0038928 A1* | 2/2017 | Park | G06F 3/0488 |
| 2017/0139556 A1* | 5/2017 | Josephson | H04W 4/38 |
| 2017/0187868 A1* | 6/2017 | Katai | G06F 3/0486 |
| 2017/0340959 A1* | 11/2017 | Tang | G06F 3/04817 |
| 2018/0025661 A1* | 1/2018 | More | G09B 5/02 434/130 |
| 2018/0028914 A1* | 2/2018 | Yamaguchi | A63F 13/92 |
| 2018/0077063 A1* | 3/2018 | Kurabayashi | A63F 13/53 |

FOREIGN PATENT DOCUMENTS

| | | | | |
|---|---|---|---|---|
| CN | 104898953 A | | 9/2015 | |
| CN | 105148517 A | | 12/2015 | |
| CN | 105760076 A | | 7/2016 | |
| CN | 106648381 A | | 5/2017 | |
| JP | 2014071724 A | * | 4/2014 | |
| WO | WO-2018137399 A1 | * | 8/2018 | ........... G06F 3/0484 |

OTHER PUBLICATIONS

Search report of CN priority application No. 201710476734.0 filed on Jun. 21, 2017, dated Jul. 3, 2018.
Corresponding CN priority application search results issued on Feb. 23, 2021.

* cited by examiner

INFORMATION PROCESSING METHOD FOR CANCELLING RELEASE OF A SKILL IN A GAME, APPARATUS, ELECTRONIC DEVICE AND STORAGE MEDIUM

The present disclosure claims priority of Chinese Patent Application No. 201710476734.0, filed on Jun. 21, 2017 and named after "Information Processing Method, Apparatus, Electronic Device and Storage Medium". Contents of the present disclosure are hereby incorporated by reference in entirety of the Chinese Patent Application.

TECHNICAL FIELD

The present disclosure relates to the technical field of electronic games, and in particular to an information processing method for Cancelling Release of a Skill in a Game and apparatus, an electronic device and a storage medium.

BACKGROUND

A skill of a virtual character in at least one game on a mobile terminal (particularly to the mobile terminal for supporting touch control) is usually required to be released by touching at least one skill button. In this process, a player for controlling the virtual character may be required to execute an operation of cancelling skill release for reasons of a misoperation, a change in a fighting chance of the game, and the like.

SUMMARY

At least one embodiment of the present disclosure provides an information processing method for Cancelling Release of a Skill in a Game and apparatus, an electronic device and a storage medium.

In one embodiment of the present disclosure, an information processing method is provided by executing a software application on a processor of a mobile terminal, and performing rendering a graphical user interface (GUI) on a touch screen of the mobile terminal, and the graphical user interface including at least one skill icon, the method including: providing a cancellation response region on the graphical user interface; when detecting a starting touch point of a touch operation is positioned within a range of the skill icon, obtaining a position of a current touch point of the touch operation in real time; when detecting that the position of the current touch point satisfies a preset condition, controlling a size of the cancellation response region to be enlarged; and when detecting that the position of the current touch point of the touch operation is within a range of the cancellation response region, cancelling release of a skill, or, when detecting that a position of an ending touch point of the touch operation is within a range of the cancellation response region, cancelling release of a skill.

In an optional embodiment, the method further includes: providing an activation response region on the graphical user interface; and the preset condition includes that the position of the current touch point is within a range of the activation response region.

In an optional embodiment, the cancellation response region is arranged within an outer contour of the activation response region.

In an optional embodiment, the activation response region and the cancellation response region are two concentric circular regions, and a radius of the activation response region is larger than a radius of the cancellation response region.

In an optional embodiment, controlling the size of the cancellation response region to be enlarged when detecting that the position of the current touch point satisfies the preset condition includes: when detecting that the position of the current touch point is within the range of the activation response region, controlling the cancellation response region to be enlarged to a predetermined size.

In an optional embodiment, controlling the size of the cancellation response region to be enlarged when detecting that the position of the current touch point satisfies the preset condition includes: when detecting that the position of the current touch point is within the range of the activation response region, controlling the size of the cancellation response region to be enlarged according to a distance between the position of the current touch point and a central point of the cancellation response region, and the distance is negatively correlated with the size.

In an optional embodiment, the preset condition includes that a distance between the position of the current touch point and a cancellation response region is less than or equal to a preset distance.

In an optional embodiment, controlling the size of the cancellation response region to be enlarged when detecting that the position of the current touch point satisfies the preset condition includes: when detecting that the distance between the position of the current touch point and the cancellation response region is less than or equal to the preset distance, controlling the cancellation response region to be enlarged to the predetermined size.

In an optional embodiment, controlling the size of the cancellation response region to be enlarged when detecting that the position of the current touch point satisfies the preset condition includes: when detecting that the distance between the position of the current touch point and the cancellation response region is less than or equal to the preset distance, controlling the size of the cancellation response region to be enlarged according to the distance between the position of the current touch point and a central point of the cancellation response region, and the distance is negatively correlated with the size.

In an optional embodiment, obtaining the position of the current touch point of the touch operation in real time when the touch operation of which the starting touch point is positioned within the range of the skill icon includes: when detecting the starting touch point of the touch operation is positioned within the range of the skill icon, rendering and displaying the cancellation response region on the graphical user interface, and obtaining the position of the current touch point of the touch operation in real time.

In an optional embodiment, providing the cancellation response region on the graphical user interface includes: providing the cancellation response region on the graphical user interface, and rendering and displaying the cancellation response region on the graphical user interface.

In an optional embodiment, the touch operation is a swipe touch operation.

In one embodiment of the present disclosure, an information processing apparatus is provided by executing a software application on a processor of a mobile terminal, and performing rendering a graphical user interface on a touch screen of the mobile terminal, and the graphical user interface including at least one skill icon, the apparatus including: a provision component, arranged to provide a cancellation response region on the graphical user interface;

a first detection component, arranged to, when detecting a starting touch point of a touch operation is positioned within a range of the skill icon, obtaining a position of a current touch point of the touch operation in real time; a second detection component, arranged to, when detecting that the position of the current touch point satisfies a preset condition, control a size of the cancellation response region to be enlarged; and a third detection unit, arranged to, when detecting that the position of the current touch point of the touch operation is within a range of the cancellation response region, cancel release of a skill, or, when detecting that a position of an ending touch point of the touch operation is within a range of the cancellation response region, cancel release of a skill.

In one embodiment of the present disclosure, an electronic device is provided, which includes: a processor; and a memory, arranged to store at least one executable instruction of the processor, and the processor is arranged to execute the at least one executable instruction to execute the above-mentioned information processing method.

In one embodiment of the present disclosure, a computer-readable storage medium is provided, on which at least one computer program is stored, the at least one computer program being executed by a processor to implement the above-mentioned information processing method.

DETAILED DESCRIPTION

For making solutions of the present disclosure better understood by those skilled in the art, technical solutions in the embodiments of the present disclosure will be clearly and completely described below in combination with the drawings in the embodiments of the present disclosure.

Limitations of skill cancellation control methods in related art are reflected in the following two aspects. In one aspect, some manners are applied to at least one skill without a direction selection requirement (such as just released by tapping). With development of game ideas, in the application of more games, a direction of the at least one skill is required to be selected by swiping before the at least one skill is released. During fast operations in the game, such manner may result in a bad user experience of the operation and make a misjudgment that the at least one skill originally expected to be released is cancelled to be released. In the other aspect, a response region for a cancellation operation is designed in some methods. However, if the response region is overlarge, it will be occupied an excessively large space on the screen, but also required for a higher accuracy of the operations. Therefore, such difficulties in the operations are further increased.

For the above-mentioned problems, there is yet no effective solution at present.

Figure 1:
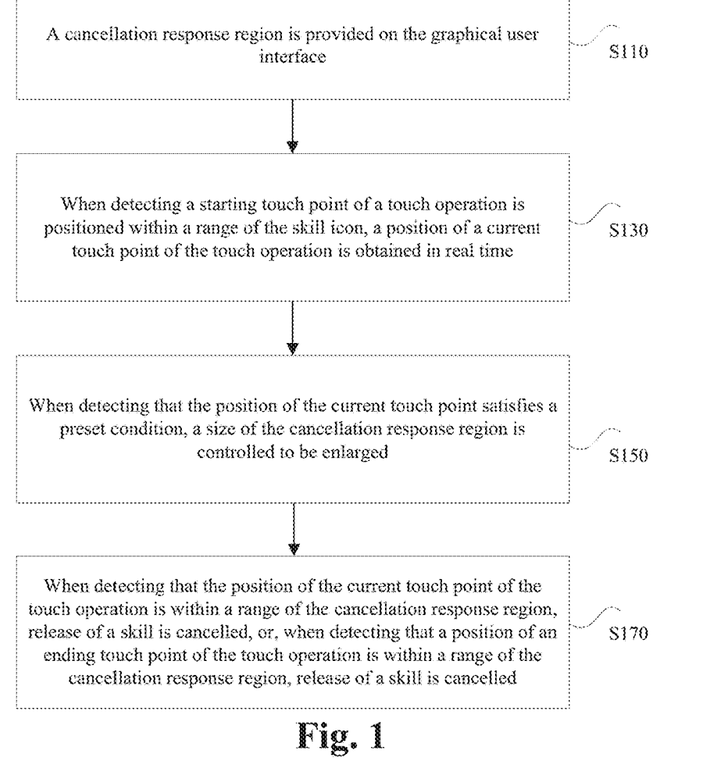
FIG. 1 is a flowchart of an information processing method according to an embodiment of the present disclosure.

FIG. 1 is a flowchart of an information processing method according to an embodiment of the present disclosure. The method is provided by executing a software application on a processor of a mobile terminal and performing rendering a graphical user interface on a touch screen of the mobile terminal, and the graphical user interface includes at least one skill icon. In the embodiment as shown in FIG. 1, the method may include the following steps.

At Step S110, a cancellation response region is provided on the graphical user interface.

At Step S130, when detecting a starting touch point of a touch operation is positioned within a range of the skill icon, a position of a current touch point of the touch operation is obtained in real time.

At Step S150, when detecting that the position of the current touch point satisfies a preset condition, a size of the cancellation response region is controlled to be enlarged.

At Step S170, when detecting that the position of the current touch point of the touch operation is within a range of the cancellation response region, release of a skill is cancelled, or, when detecting that a position of an ending touch point of the touch operation is within a range of the cancellation response region, release of a skill is cancelled.

According to the information processing method in this exemplary embodiment, in one aspect, the cancellation response region is provided on the graphical user interface, and when detecting a starting touch point of a touch operation is positioned within a range of the skill icon, the position of the current touch point of the touch operation is obtained in real time, so that the information processing method may be applied to different types of skill cancellation (including a skill without a direction selection requirement and a skill with the direction selection requirement). In the other aspect, when detecting that the position of the current touch point is within the range of the cancellation response region, the size of the cancellation response region is controlled to be enlarged, and when detecting that the position of the current touch point of the touch operation is within the range of the cancellation response region, release of the skill is cancelled, or, when detecting that the position of the ending touch point of the touch operation is within the range of the cancellation response region, release of the skill is cancelled. Through executing the above-mentioned steps of the method not only a space utilization of the GUI may be increased, but also difficulties in operation may be reduced, operation accuracy may be improved, and a convenient and accurate skill cancellation manner is provided for a game user, which satisfies operation requirement of the user and further improves user experience.

Each step of the information processing method in the exemplary embodiment will further be described below.

At Step S110, the cancellation response region is provided on the graphical user interface.

In this embodiment, the operations that the cancellation response region is provided on the graphical user interface include that: the cancellation response region is provided on the graphical user interface, and the cancellation response region is rendered and displayed on the graphical user interface. That is, before a player clicks the skill icon, the cancellation response region is rendered and displayed on the graphical user interface. In such a manner, even a novice player may clearly know about this function.

Figure 2:
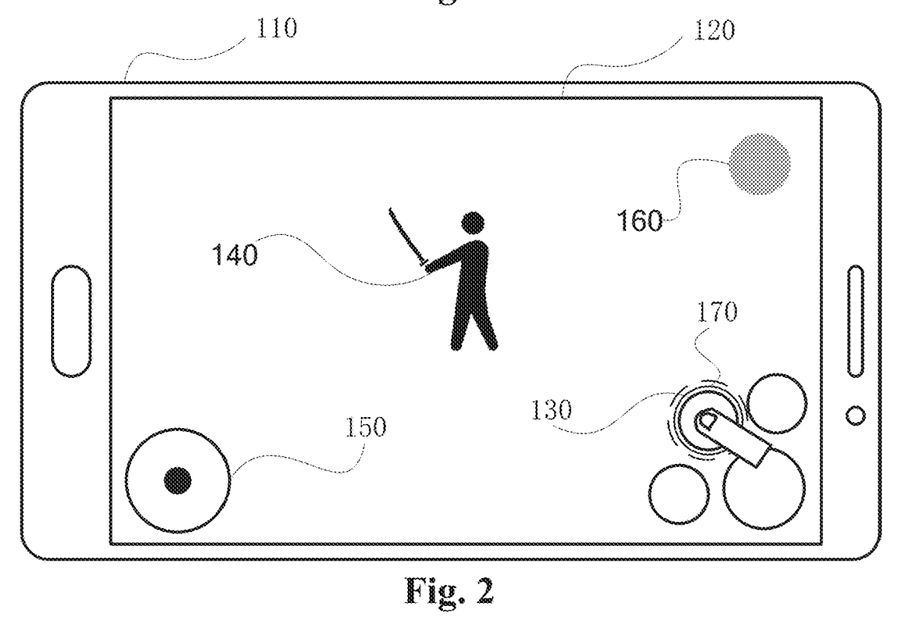
FIG. 2 is a schematic diagram of a graphical user interface of a mobile terminal according to an exemplary embodiment of the present disclosure.

For example, in an exemplary embodiment as shown in FIG. 2, a graphical user interface 120 is obtained by executing a software application on a processor of a mobile terminal 110 and rendering on a touch screen of the mobile terminal. Multiple skill icons are arranged at a right lower part of the graphical user interface 120, and a skill icon 130 therein is taken as an example for description in this embodiment. The graphical user interface 120 further includes a virtual object 140, a moving controller 150 and a cancellation response region 160.

A skill indicated by the skill icon 130 may be one of the following conditions.

First, the skill indicated by the skill icon 130 is an attack skill (for example, a skill capable of reducing an HP (Hit Points/Health Points) value of a virtual object of an enemy party).

Second, the skill indicated by the skill icon 130 is a HP recovering skill (for example, a skill capable of recovering a HP value of a virtual object of an ally party).

Third, the skill indicated by the skill icon 130 is a freezing skill (for example, a skill capable of stopping or retarding an action of the virtual object of the enemy party).

The skill indicated by the skill icon 130 may be a skill with the direction selection requirement, or a skill without the direction selection requirement (just released by tapping).

In an optional embodiment, after the skill icon 130 is touched, a virtual joystick 170 arranged to control a skill release position or direction may be generated at a center of the skill icon 130 or the starting touch point of the touch operation. The player may control the virtual joystick 170 via a swiping to determine at least one of the skill release position and direction, and the skill is released when the user ends the touch operation. There are no limitations in the present disclosure. The moving controller 150 is arranged to control at least one of movement and orientation of the virtual object 140. A shape of the moving controller 150 may be circular or the other shape (for example, ellipse or hexagon). As shown in FIG. 2, the moving controller 150 is positioned on a left side of the graphical user interface 120, and the skill icon 130 is positioned on a right side of the graphical user interface 120. Certainly, the skill icon and the moving controller may also be arranged at the other positions of the graphical user interface. For example, the moving controller 150 is positioned on the right side of the graphical user interface 120, and the skill icon 130 is positioned on the left side of the graphical user interface 120.

The cancellation response region 160 is provided on the graphical user interface 120, and the cancellation response region 160 is rendered and displayed on the graphical user interface 120. That is, before the player clicks the skill icon, the cancellation response region 160 is rendered and displayed on the graphical user interface 120. And in such a manner, even a novice player may clearly know about this function.

A shape of the cancellation response region 160 may be a circular or a regular polygon such as an ellipse, a triangle, a rectangle and a hexagon and an irregular figure (for example, other figures of an irregular polygon, a horse hoof, a tiger head, a bear paw and the like).

The cancellation response region 160 may be at any position of the graphical user interface 120. In an exemplary embodiment, the cancellation response region 160 is positioned above the skill icon (for example, as shown in FIG. 2, the cancellation response region 160 is positioned at a right upper part of the graphical user interface 160 and above the skill icon). Or, the cancellation response region 160 is arranged at a position between the skill icon and the moving controller 150.

The cancellation response region 160 may include an operation indicator. For example, the cancellation response region 160 may include a text or graphical indicator of the skill release cancellation so that a novice player may be guided to execute an operation of cancelling skill release.

At Step S130, when detecting the starting touch point of the touch operation is positioned within the range of the skill icon, the position of the current touch point of the touch operation is obtained in real time.

In this embodiment, when detecting the starting touch point of the touch operation is positioned within the range of the skill icon, the position of the current touch point of the touch operation is obtained in real time.

Figure 3:
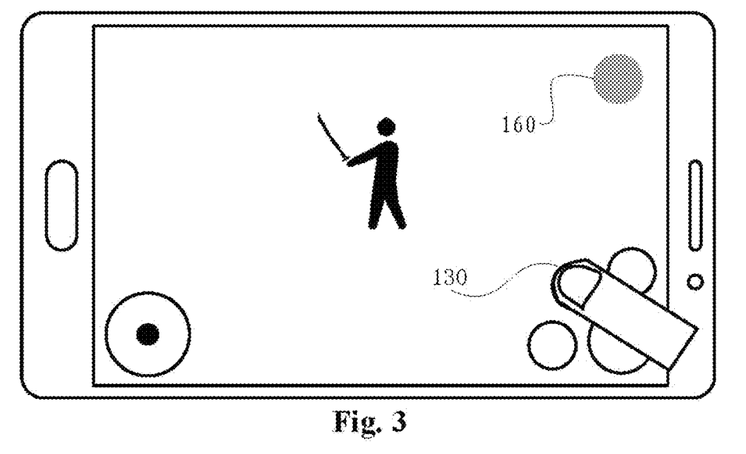
FIG. 3 is a schematic diagram of an interaction operation according to an exemplary embodiment of the present disclosure.

For example, in an exemplary embodiment as shown in FIG. 3, a touch operation of the skill icon (for example, the skill icon 130) with a finger of the player is detected. When detecting such a touch operation, a position of a current touch point of the touch operation is obtained in real time. For example, at a time point as shown in FIG. 3, the position of the current touch point is within the range of the skill icon 130.

In an optional embodiment, when detecting a touch point of a touch operation passes through the range of the skill icon, a position of a current touch point of the touch operation is obtained in real time. That is, a starting point of the touch operation may not be positioned within the scope of the skill icon, and the starting touch point may not be within the range of the skill icon, but the current touch point passes through the skill icon in a moving process of the touch operation.

At Step S150, when detecting that the position of the current touch point satisfies the preset condition, the size of the cancellation response region is controlled to be enlarged.

The present condition is arranged to determine that the player is intended to cancel skill release. An activation response region is provided on the graphical user interface and the preset condition may be that the position of the current touch point is within a range of the activation response region. The present condition may also be that a distance between the position of the current touch point and a cancellation response region is less than or equal to a preset distance. The preset condition may further be another preset condition arranged to determine that the player is intended to cancel skill release.

Controlling the size of the cancellation response region to be enlarged may refer to geometric similar enlargement. That is, shapes of the cancellation response region before and after enlarging are geometrically similar. Controlling the size of the cancellation response region may also refer to non-geometric similar enlargement. That is, the shapes of the cancellation response region before and after enlarging are not geometrically similar, but an area occupied by the cancellation response region after enlarging is larger than an area occupied by the cancellation response region before enlarging.

In this embodiment, the preset condition may be that the position of the current touch point is within the range of the activation response region. That is, when detecting that the position of the current touch point is within the range of the activation response region, the size of the cancellation response region is controlled to be enlarged.

Figure 4:
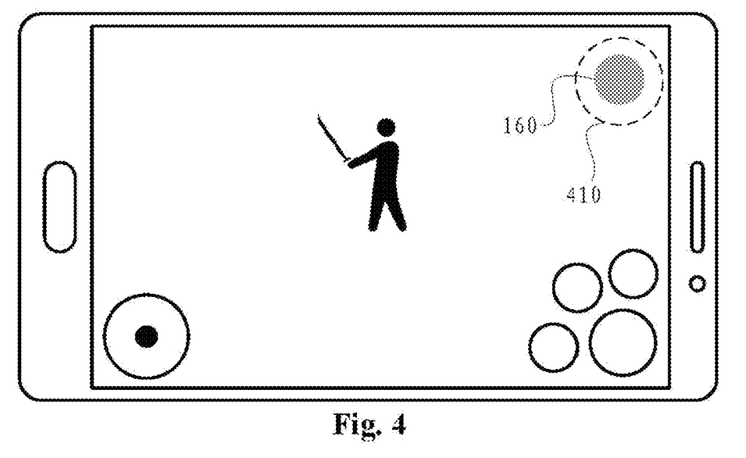
FIGS. 4-5 are a cancellation response region and an enlarged diagram of cancellation response region according to an exemplary embodiment of the present disclosure.

For example, in an exemplary embodiment as shown in FIG. 4, an activation response region 410 is provided on the graphical user interface, and the cancellation response region 160 is arranged within an outer contour of the activation response region 410. In an exemplary embodiment, the activation response region 410 and the cancellation response region 160 are two concentric circular regions. A radius of the activation response region 410 is larger than a radius of the cancellation response region 160. The activation response region 410 may be visible and may also be invisible. In an exemplary embodiment, the activation response region 410 is invisible, so that a space of the GUI may be fully utilized without blocking.

Figure 5:
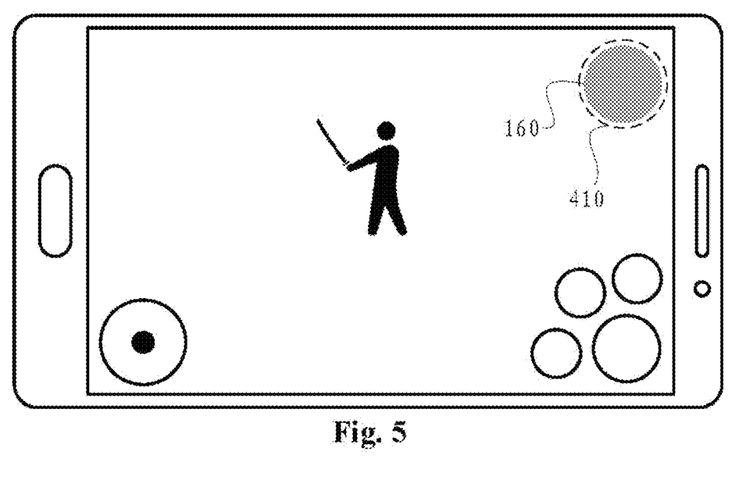
Figure 6:
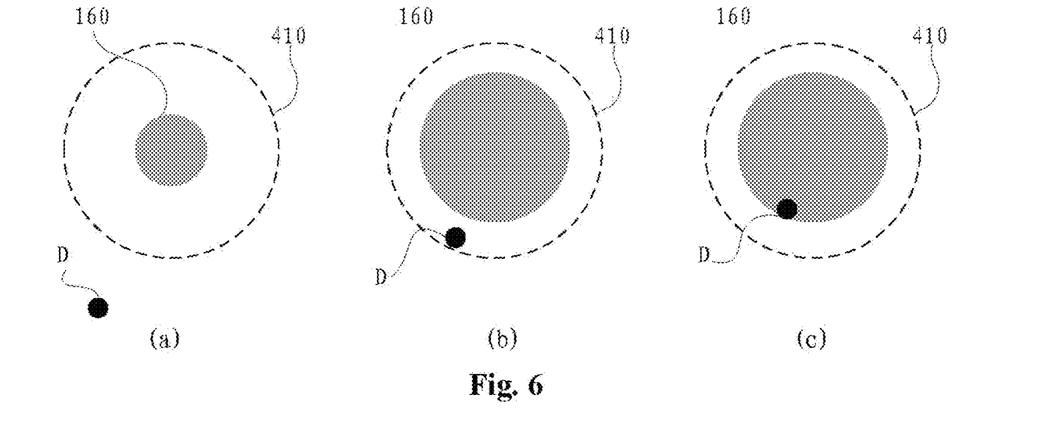
FIG. 6 is a schematic diagram of a skill release cancellation process according to an exemplary embodiment of the present disclosure.

In at least one of exemplary embodiments shown in FIGS. 5-6, when detecting that the position of the current touch point is within the range of the activation response region 410, the size of the cancellation response region 160 is controlled to be enlarged.

For example, according to an exemplary embodiment as shown in FIG. 6(*a*), a position of a current touch point D obtained in real time is outside the range of the activation response region 410. When detecting that the position of the current touch point D is within the range of the activation response region 410, the size of the cancellation response region 160 is controlled to be enlarged.

Figure 7:
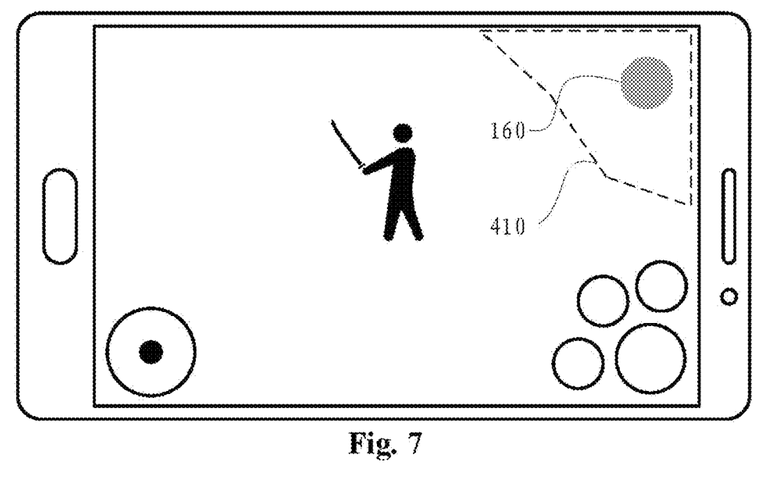
FIGS. 7-9 are schematic diagrams of an activation response region according to an exemplary embodiment of the present disclosure.
Figure 8:
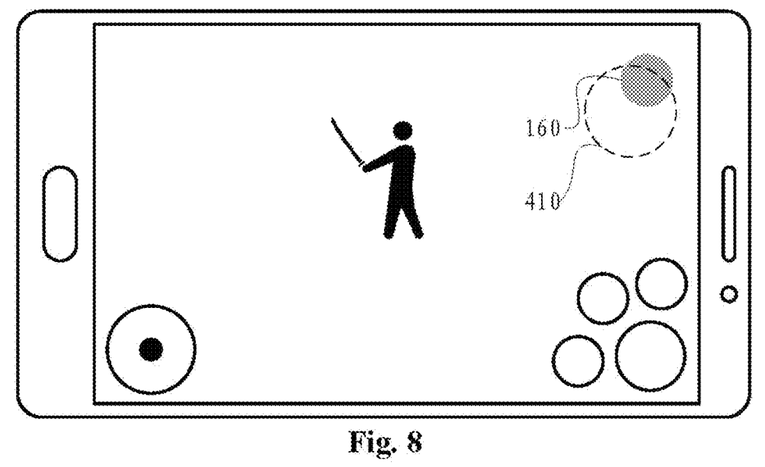
Figure 9:
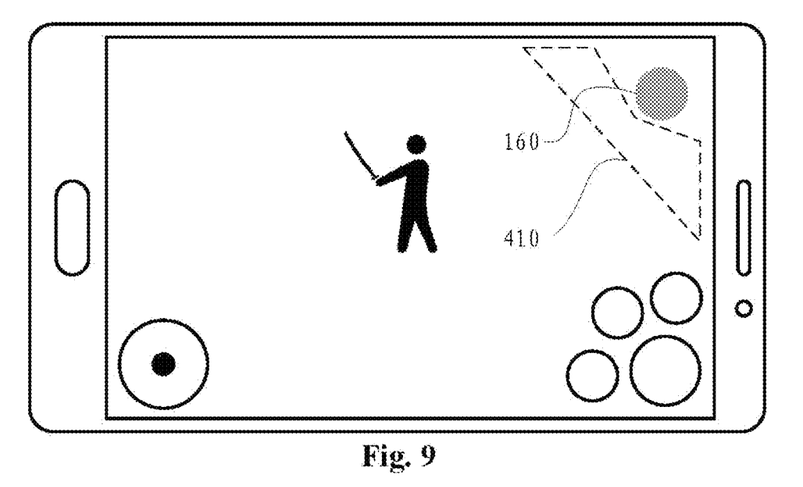

It is important to note that a shape of the activation response region 410 and a relationship between the activation response region 410 and the cancellation response region 160 are not limited to the conditions in the embodiment and may have other conditions. The shape of the activation response region 410 may also be any other shape except circular. For example, in an exemplary embodiment as shown in FIG. 7, the shape of the activation response region 410 may also be an irregular polygon. In addition, according to an exemplary embodiment as shown in FIG. 8, a position where the activation response region 410 does not always cover the cancellation response region 160 completely and may also partially cover the cancellation response region 160. Or, according to the exemplary embodiment as shown in FIG. 8, the position where the activation response region 410 does not fully cover the cancellation response region 160.

In an optional embodiment, the preset condition includes that a distance between the position of the current touch point and a cancellation response region is less than or equal to a preset distance. That is, when detecting that the distance between the position of the current touch point and the cancellation response region is less than or equal to the preset distance, the size of the cancellation response region is controlled to be enlarged.

For example, a distance between the position of the current touch point and a preset point (for example, a central point) in the cancellation response region is detected. When detecting that the distance between the position of the current touch point and the cancellation response region is less than or equal to the preset distance, the size of the cancellation response region is controlled to be enlarged.

In this embodiment, when detecting that the position of the current touch point satisfies the preset condition, the cancellation response region is controlled to be enlarged to a predetermined size.

For example, in the exemplary embodiments shown in FIGS. 6(*a*)-6(*b*), when detecting that the position of the current touch point D is within the range of the activation response region 410 (or, when detecting that the distance between the position of the current touch point D and the cancellation response region 160 is less than or equal to the preset distance), the cancellation response region 160 is controlled to be enlarged to a predetermined size. Specifically, in the exemplary embodiment as shown in FIG. 6(*a*), the radius of the cancellation response region 160 is r. When detecting that the position of the current touch point D is within the range of the activation response region 410, the cancellation response region 160 is controlled to be enlarged to a radius of R. And R is a preset radius and R is larger than r. In the exemplary embodiment as shown in FIG. 6(*b*), R is smaller than the radius of the activation response region 410. That is, at this moment, the enlarged cancellation response region 160 may not cover the current touch point D.

In an optional embodiment, relative positions of the current touch point D and an initial position of the skill icon 130 may also be taken as the preset condition for controlling the cancellation response region to be enlarged. For example, when a distance between the current touch point D and the initial position of the skill icon 130 is larger than a preset value, the cancellation response region 160 is controlled to be enlarged. That is, a swipe of the user over the skill icon out of a preset range is determined as the preset condition. This embodiment is particularly adapted to the following condition. After the skill icon 130 is tapped, the virtual joystick arranged to control the skill release position or direction is triggered to be generated within the position range of the skill icon 130. The system determines the skill release position according to the position of the current touch point D of the user and releases the skill when the touch operation is ended. That is, the finger of the player leaves the touch screen. Under such a condition, the position of the current touch point D is outside a preset range centered on the virtual joystick may be taken as the preset condition for controlling the cancellation response region 160 to be enlarged. In such a manner, the position of the current touch point D is arranged to set the skill release direction, and is also arranged to trigger enlargement of the cancellation response region 160 in the other aspect. Release or cancellation of the skill may be set in one of the following manners. In a first manner, when the current touch point D enters into the cancellation response region, skill release is directly cancelled, and the skill icon 130 is back to an initial state. That is, the virtual joystick arranged to control the skill release position or direction is cancelled. When the position of the ending touch point of the touch operation is outside the range of the cancellation response region, the skill release position or direction is determined according to the ending touch point of the touch operation, then the skill is released. In a second manner, when the position of the ending touch point of the touch operation is within the range of the cancellation response region, release of the skill is cancelled. When the position of the ending touch point of the touch operation is outside the range of the cancellation response region, the skill release position or direction is determined according to the ending touch point of the touch operation, then the skill is released.

In an optional embodiment, when detecting that the position of the current touch point satisfies the preset condition, the size of the cancellation response region is controlled to be enlarged according to the distance between the position of the current touch point and the central point of the cancellation response region. The distance is negatively correlated with the size.

For example, when detecting that the position of the current touch point D is within the range of the activation response region 410 (or, when detecting that the distance between the position of the current touch point D and the cancellation response region 160 is less than or equal to the preset condition), if detecting that the touch point D continues to move close to the cancellation response region 160, the size of the cancellation response region is controlled to be enlarged according to the distance between the position of the current touch point D and the central point (or another preset point) of the cancellation response region 160. Specifically, if the current touch point D is closer to the cancellation response region 160, the size of the cancellation response region 160 is larger. That is, the distance is negatively correlated with the size.

In an optional embodiment, when detecting the touch operation of which the starting touch point is positioned within the range of the skill icon, obtaining the position of the current touch point of the touch operation in real time includes the following steps. When detecting the starting touch point of the touch operation is positioned within the range of the skill icon, the cancellation response region is rendered and displayed on the graphical user interface, and the position of the current touch point of the touch operation is obtained in real time. That is, the cancellation response region is provided on the graphical user interface. However, the cancellation response region is not rendered and displayed on the graphical user interface as a default, and when detecting the starting touch point of the touch operation is positioned within the range of the skill icon, the cancellation response region is rendered and displayed on the graphical user interface, and the position of the current touch point of the touch operation is obtained in real time. In such a manner, after the player touches the skill icon, the cancellation response region may be rendered and displayed on the graphical user interface, so that the space of GUI is saved, blocking of unnecessary display content on the screen is avoided, and the utilization rate of the GUI is increased.

At Step S170, when detecting that the position of the current touch point of the touch operation is within the range of the cancellation response region, release of the skill is cancelled, or, when detecting that the position of the ending touch point of the touch operation is within the range of the cancellation response region, release of the skill is cancelled.

In this embodiment, when detecting that the position of the ending touch point of the touch operation is within the range of the cancellation response region, release of the skill is cancelled.

For example, the current touch point D of the touch operation (for example, a swipe) is positioned in the cancellation response region 160. In the exemplary embodiment as shown in FIG. 6(c), if a touch object (for example, a finger or a stylus) leaves the touch screen at this moment, the current touch point D is the ending touch point of the touch operation. In such a manner, when detecting that the position of the ending touch point of the touch operation is within the range of the cancellation response region, release of the skill is cancelled. Therefore, the operation of cancelling release of the skill is more accurate and further preventing the player from false triggering the operation of "cancelling release of the skill".

In an optional embodiment, when detecting that the position of the current touch point of the touch operation is within the range of the cancellation response region, release of the skill is cancelled.

For example, if the current touch point of the touch operation (for example, the swipe) enters into the cancellation response region 160, cancelling release of the skill, which is unnecessary to wait until the touch object (for example, the finger or the stylus) leaves the touch screen for cancellation of release of the skill. Therefore, the operation of cancelling release of the skill is more convenient, and time for the operation of cancelling release of the skill in an intensive fight of the game is further saved.

In one embodiment of the present disclosure, an information processing apparatus is further provided. The apparatus is provided by executing a software application on a processor of a mobile terminal and performing rendering a graphical user interface on a touch screen of the mobile terminal, and the graphical user interface includes at least one skill icon. The apparatus includes: a provision component, a first detection component, a second detection component and a third detection component.

The provision component is arranged to provide a cancellation response region on the graphical user interface.

The first detection component is arranged to, when detecting the starting touch point of the touch operation is positioned within the range of the skill icon, obtain a position of a current touch point of the touch operation in real time.

The second detection component is arranged to, when detecting that the position of the current touch point satisfies a preset condition, control a size of the cancellation response region to be enlarged.

The third detection component is arranged to, when detecting that the position of the current touch point of the touch operation is within a range of the cancellation response region, cancel release of a skill, or, when detecting that a position of an ending touch point of the touch operation is within the range of the cancellation response region, cancel release of the skill.

According to one embodiment of the present disclosure, an electronic device is further provided. The electronic device includes: a processing component, which may further include one or more processors, and a memory resource represented by a memory, arranged to store instructions executable for the processing component, for example, application programs. The application programs stored in the memory may include at least one module of which each corresponds to a set of instructions. In addition, the processing component is arranged to execute the instructions to execute the above-mentioned virtual object control method.

The electronic device may further include: a power component, a wired or wireless network interface and an Input/Output (I/O) interface. The power component is arranged to perform power management on the electronic device. The wired or wireless network interface is arranged to connect the electronic device to a network. The electronic device may be operated on the basis of an operating system stored in the memory, for example, Android, iOS, Windows, Mac OS X, Unix, Linux, Free BSD or the like.

According to one embodiment of the present disclosure, a computer-readable storage medium is further provided, on which at least one program product capable of implementing the method of the specification is stored. In some possible implementation modes, each aspect of the present disclosure may further be implemented as a form of the at least one program product, which includes at least one program code. When the at least one program product runs on a terminal device, the at least one program code is arranged to enable the terminal device to execute the steps described in the "exemplary method" part of the specification according to various exemplary implementation modes of the present disclosure. The at least one program product may adopt a portable Compact Disc Read-Only Memory (CD-ROM) and include the at least one program code and may run on the terminal device, for example, a personal computer. However, the at least one program product of the present disclosure is not limited. In the present disclosure, the readable storage medium may be any physical medium including or storing at least one program, and the at least one program may be used by or used in combination with an instruction execution system, device or apparatus.

The at least one program product may adopt one or any combination of multiple readable media. The readable medium may be a readable signal medium or a readable storage medium. The readable storage medium may be, but not limited to, for example, electric, magnetic, optical, electromagnetic, infrared or semiconductor systems, devices or apparatuses or any combination thereof. A more specific example (non-exhausted list) of the readable storage medium includes: an electrical connection with one or more wires, a portable disk, a hard disk, a Random Access Memory (RAM), a Read-Only Memory (ROM), an Erasable Programmable ROM (EPROM) or flash memory, an optical fiber, a portable CD-ROM, an optical storage device, a magnetic storage device or any proper combination thereof.

Obviously, the described embodiments are not all embodiments but part of embodiments of the present disclosure. All other embodiments obtained by those of ordinary skilled in the art on the basis of the embodiments in the present disclosure without creative work shall fall within the scope of protection of the present disclosure.

It is important to note that terms "first", "second" and the like in the specification, claims and drawings of the present disclosure are adopted not to describe a specific sequence or order but to distinguish similar objects. It should be understood that data used like this may be exchanged under a proper condition for implementation of the embodiments of the present disclosure described here in a sequence except those sequences shown or described here. In addition, terms "include" and "have" and any transformations of the terms "include" and "have" are intended to cover nonexclusive inclusions. For example, a process, method, system, product or device including a series of steps or units is not limited to those steps or units which are clearly listed, but may include other steps or units which are not clearly listed or intrinsic to the process, the method, the product or the device.

In one embodiment of the present disclosure, an information processing method is provided. It is important to note that the steps shown in the flowcharts of the drawings may be executed in a computer system, for example, a group of computers, capable of executing instructions. Moreover, although logic sequences are shown in the flowcharts, the shown or described steps may be executed in sequences different from the sequences shown here under some conditions.

Sequence numbers of the embodiments of the present disclosure are adopted for description and do not represent quality of the embodiments.

Each embodiment in the embodiments of the present disclosure is described with different emphases, and parts which are not elaborated in a certain embodiment may refer to related descriptions of the other embodiments.

In some embodiments provided by the application, it should be understood that the disclosed technical content may be implemented in another manner. The apparatus embodiment described above is schematic, and for example, division of the units is logic function division, and other division manners may be adopted during practical implementation. For example, multiple units or components may be combined or integrated into another system, or some characteristics may be neglected or not executed. In addition, coupling or indirect coupling or communication connection between each displayed or discussed component may be indirect coupling or communication connection, implemented through some interfaces, of the units or modules, and may be electrical or adopt other forms.

The abovementioned units described as separate parts may or may not be physically separated, and parts displayed as units may or may not be physical units, and namely may be located in the same place, or may also be distributed to multiple units. Part or all of the units may be selected to achieve the purpose of the solutions of the embodiments according to a practical requirement.

In addition, each function unit in each embodiment of the present disclosure may be integrated into a processing component, each component may also exist physically independently, and two or more than two components may also be integrated into a component. The abovementioned integrated component may be implemented in a hardware form, and may also be implemented in form of software function unit.

When being implemented in form of software function unit and sold or used as an independent product, the integrated unit may also be stored in a computer-readable storage medium. Based on such an understanding, the technical solutions of the present disclosure substantially or parts making contributions to the conventional art or all or part of the technical solutions may be embodied in form of software product. The computer software product is stored in a storage medium, including a plurality of instructions arranged to enable a computer device (which may be a personal computer, a server, a network device or the like) to execute all or part of the steps of the method in each embodiment of the present disclosure.

The above are exemplary implementation modes of the present disclosure. It should be pointed out that those of ordinary skilled in the art may further make a plurality of improvements and embellishments without departing from the principle of the present disclosure and these improvements and embellishments shall also fall within the scope of protection of the present disclosure.

What is claimed is:

1. An information processing method for cancelling release of a skill in a game provided by executing a software application on a processor of a mobile terminal, and rendering a graphical user interface on a touch screen of the mobile terminal, wherein the graphical user interface comprises at least one skill icon, the method comprising:
   providing a cancellation response region on the graphical user interface;
   detecting a touch point of a touch operation passing through a range of the skill icon;
   obtaining a position of a current touch point of the touch operation outside the range of the skill icon in real time, wherein the obtained position of the current touch point includes a position whose distance to the cancellation response region is less than or equal to a preset distance;
   controlling a size of the cancellation response region to be enlarged based on at least one preset condition for the touch operation, wherein
      the at least one preset condition comprises a first preset condition in which a distance between the position of the current touch point and the cancellation response region is less than or equal to the preset distance,
      the size of the cancellation response region is enlarged based on the first preset condition according to a distance between the position of the current touch point and a central point of the cancellation response region, and the distance between the position of the current touch point and the central point of the cancellation response region is negatively correlated with the size;

detecting that the position of a current touch point or an ending touch point of the touch operation is within a range of the cancellation response region; and in response to detecting that the position of the current touch point of the touch operation is within a range of the cancellation response region, cancelling the release of the skill, or, in response to detecting that a position of an ending touch point of the touch operation is within the range of the cancellation response region, cancelling the release of the skill.

2. The method as claimed in claim 1, further comprising: providing an activation response region on the graphical user interface, wherein the at least one preset condition further comprises a second preset condition in which the position of the current touch point is within a range of the activation response region.

3. The method as claimed in claim 2, wherein the cancellation response region is arranged within an outer contour of the activation response region.

4. The method as claimed in claim 3, wherein the activation response region and the cancellation response region are two concentric circular regions, and a radius of the activation response region is larger than a radius of the cancellation response region.

5. The method as claimed in claim 2, wherein the size of the cancellation response region is enlarged based on the second preset condition to a predetermined size.

6. The method as claimed in claim 2, wherein the size of the cancellation response region is enlarged based on the second preset condition according to a distance between the position of the current touch point and a central point of the cancellation response region, wherein the distance is negatively correlated with the size.

7. The method as claimed in claim 1, wherein the size of the cancellation response region is enlarged based on the first preset condition to a predetermined size.

8. The method as claimed in claim 1, wherein the detecting a touch point of the touch operation passing through the range of the skill icon and the obtaining the position of the current touch point of the touch operation in real time comprises:

detecting a starting touch point of the touch operation positioned within the range of the skill icon, rendering and displaying the cancellation response region on the graphical user interface, and obtaining the position of the current touch point of the touch operation in real time.

9. The method as claimed in claim 1, wherein the touch operation is a swipe operation.

10. The method as claimed in claim 1, further comprising detecting a starting touch point of the touch operation positioned within the range of the skill icon, and generating a virtual joystick arranged to control a skill release position or direction at a center of the skill icon or the starting touch point of the touch operation on the graphical user interface.

11. The method as claimed in claim 1, wherein the cancellation response region comprises an operation indicator for guiding to execute an operation of cancelling skill release.

12. The method as claimed in claim 1, wherein the at least one preset condition further comprises a third preset condition in which a distance between the current touch point and an initial position of the skill icon is more than a preset value, and the size of the cancellation response region is enlarged based on the third preset condition.

13. The method as claimed in claim 1, wherein the providing the cancellation response region on the graphical user interface comprises rendering and displaying the cancellation response region on the graphical user interface in response to detecting a starting touch point of the touch operation positioned within the range of the skill icon.

14. An electronic device, comprising:

a processor; and a memory, connected with the processor and arranged to store at least one executable instruction of the processor, wherein the processor is arranged to execute the at least one executable instruction, the at least one executable instruction is for cancelling release of a skill in a game and rendering a graphical user interface on a touch screen, the graphical user interface comprising at least one skill icon, and the at least one executable instruction comprises:

providing a cancellation response region on the graphical user interface;

when detecting a touch point of a touch operation passing through a range of the skill icon, obtaining a position of a current touch point of the touch operation outside the range of the skill icon in real time;

when detecting that the position of the current touch point satisfies a preset condition, controlling a size of the cancellation response region to be enlarged, and wherein the controlling the size of the cancellation response region to be enlarged when detecting that the position of the current touch point satisfies the preset condition comprises: when detecting that a distance between the position of the current touch point and the cancellation response region is less than or equal to a preset distance, controlling the size of the cancellation response region to be enlarged according to a distance between the position of the current touch point and a central point of the cancellation response region, wherein the distance between the position of the current touch point and the central point of the cancellation response region is negatively correlated with the size; and when detecting that the position of the current touch point of the touch operation is within a range of the cancellation response region, cancelling the release of the skill, or, when detecting that a position of an ending touch point of the touch operation is within the range of the cancellation response region, cancelling the release of the skill.

15. A non-transitory computer-readable storage medium, on which at least one computer program is stored, the at least one computer program being executed by a processor to implement an information processing method for cancelling release of a skill in a game provided by executing a software application on a processor of a mobile terminal, and rendering a graphical user interface on a touch screen of the mobile terminal, wherein the graphical user interface comprises at least one skill icon, the method comprising:

providing a cancellation response region on the graphical user interface;

when detecting a touch point of a touch operation passing through a range of the skill icon, obtaining a position of a current touch point of the touch operation outside the range of the skill icon in real time;

when detecting that the position of the current touch point satisfies a preset condition, controlling a size of the cancellation response region to be enlarged, wherein controlling the size of the cancellation response region to be enlarged when detecting that the position of the current touch point satisfies the preset condition comprises: when detecting that a distance between the position of the current touch point and the cancellation response region is less than or equal to a preset distance, controlling the size of the cancellation response region to be enlarged according to a distance between the position of the current touch point and a central point of the cancellation response region, wherein the distance between the position of the current touch point and the central point of the cancellation response region is negatively correlated with the size; and when detecting that the position of the current touch point of the touch operation is within a range of the cancellation response region, cancelling the release of the skill, or, when detecting that a position of an ending touch point of the touch operation is within the range of the cancellation response region, cancelling the release of the skill.

* * * * *